May 11, 1948.  J. A. SPERRY  2,441,548
MOLD
Filed June 7, 1945  3 Sheets-Sheet 1

INVENTOR.
JOHN A. SPERRY
BY

May 11, 1948.    J. A. SPERRY    2,441,548
MOLD
Filed June 7, 1945    3 Sheets-Sheet 2

INVENTOR.
JOHN A. SPERRY
BY
Gordon C. Mack

May 11, 1948.  J. A. SPERRY  2,441,548
MOLD
Filed June 7, 1945  3 Sheets-Sheet 3

INVENTOR.
JOHN A. SPERRY
BY

Patented May 11, 1948

2,441,548

UNITED STATES PATENT OFFICE 2,441,548

MOLD

John A. Sperry, Tallmadge, Ohio, assignor to The Baker, McMillen Co., Akron, Ohio, a corporation of Ohio Application June 7, 1945, Serial No. 598,009

19 Claims. (Cl. 18—39)

This invention relates to an improved type of mold for curing plastics and the like and, more particularly, for curing in a high-frequency field. It includes the mold itself, the method of constructing it, the method of curing foamed latex and the like in such a mold, and also apparatus suitable for conducting such a process.

It has recently been proposed that foamed latex and other plastics be cured by high-frequency heating. Wooden molds have been used to demonstrate the feasibility of curing in this manner. However, wooden molds have certain disadvantages. For instance, the wooden molds warp, it is difficult to cut a compound curve into a wooden surface, and the cost of making wooden molds for complicated shapes makes their use prohibitive.

The molds of this invention were at first developed as an improvement over wooden molds for curing by high-frequency heating. They were originally made of glass fabric. But these fabric molds have other uses; and other fabrics, etc., may be employed in their manufacture. For example, they may be used for curing in steam, etc. The fabric may be glass fabric, asbestos fabric, etc., for high-frequency heating, and for other types of heating the molds may be constructed of such fabrics or other fabrics, such as steel fabric and the like.

Compared to the metal molds to which the industry has been accustomed and the molds formed of blocks of wood which were used experimentally in high-frequency curing of foamed latex, the glass fabric molds are shell-like. Their walls are thin, and they are relatively fragile. Such construction is novel and has distinct advantages. For instance, the light weight of these molds makes them easy to handle, and this is an advantage regardless of the specific use to which they are put. For steam heating and other types of heating in which the heat for the mold contents must be transmitted through the walls of the mold, the thin walls have a particular advantage. Shell-like molds have advantages, whether made of fabric or not; and as explained in what follows, the molds of this invention are not necessarily made of glass fabric although that is presently the preferred construction material.

The molds previously used for high-frequency heating have had a flat top and flat bottom. The plates used for producing the high-frequency field have been in contact with or in very close proximity to the flat top and flat bottom of the mold. There were no air pockets, or at least no large air pockets, between the mold and any portion of either plate. It is well known that such air pockets, being good insulators, impede the setting up of currents in their path. This results in uneven heating or curing. It has now been found that such uneven heating—whether caused by an air pocket or due to another cause—can be overcome in the curing of foamed latex or other material which contains an electrolyte which disappears as the curing progresses. For instance, as foamed latex is cured, the water is vaporized. If the foamed latex in one portion of a mold is heated more rapidly or to a higher temperature than that in another part of the mold, it loses its water before the latex in another portion of the mold and thus becomes less conductive. As this occurs, more current flows through other parts of the mold. Thus, as a portion of the foamed latex is cured and loses its water, the portion of the foamed latex which at first is heated to the highest temperature becomes less conductive, with the result that other portions of the mold contents become relatively more conductive, are heated to a higher temperature, lose water, and are cured. The entire contents of the mold are thus progressively heated until all the water is vaporized and the rubber is cured. This takes place regardless of the reason why the whole mold contents do not heat to the same temperature at the first, whether this be due to impedance caused by an air pocket or other cause.

The invention includes shell-like molds supported so as to hold the intended liquid level horizontal. It includes reinforced shell-like molds and, particularly, reinforcements to be used on molds for curing foamed latex, to help carry the weight of cores employed to give added resilience to the molded sponge-rubber products.

The molds of this invention are cheap to construct; they are light in weight; they may be made of materials unaffected by steam and, therefore, may be cured in steam without danger of warping; they may be used without danger of warping when used for curing foamed latex and like aqueous materials which give off quantities of steam on curing; they may be made of nonconducting material which is not appreciably affected by high-frequency heating, thus keeping heat losses in this type of heating at a minimum; and they are of shell construction, and this further keeps down the power consumed in heating them. These and other advantages in the construction and use of this type of mold will be apparent from the description which follows.

The invention will be further described in connection with the accompanying drawings, in which.

Figure 1:
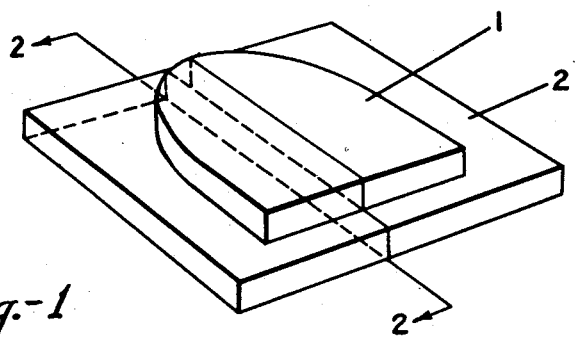
Fig. 1 is a view in perspective of a building form for a simple molded object mounted on a base.
Figure 2:
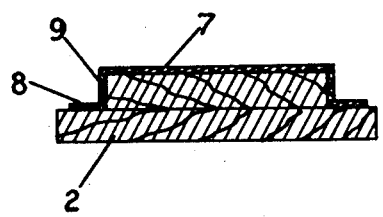
Fig. 2 is a section on the line 2—2 of Fig. 1 but with the building form shown as composed of wood and with a glass-fabric mold formed over it.

In Fig. 1 the pattern or building form 1 is mounted on the base 2. This pattern is for an ordinary chair seat. It is relatively thin and uncored. It may be constructed of wood or plaster of Paris or metal or any material ordinarily employed in the manufacture of molds. For the sake of clarity, the composition of the pattern is not indicated in Fig. 1 but is shown as wood in Fig. 2. Fig. 2 illustrates how glass fabric may be shaped over such a mold. If the corners are rounded and the pattern is not too thick, an ordinary sheet of glass fabric may easily be shaped to conform to the outline illustrated. Several plies of the fabric are usually required to give sufficient strength to the mold to enable it to withstand ordinary handling. If necessary, each ply of the fabric may be made up of several pieces. For the purpose of illustration it may be supposed that the mold of the drawings is formed of several pieces of glass fabric; namely, a top portion 7, an outside rim portion 8, and a wall portion 9. These pieces will be separately cut from the glass fabric with sufficient excess material at the edges to permit overlapping for the union of the several pieces. Any desired number of plies, for example, half a dozen, may be built up in this manner to obtain the desired ruggedness.

The glass fabric may be woven with woof and weft, or the fibers may be sheeted without any weft and treated with a plastic to cement them together and to cement the several plies and to set and reinforce or stiffen the whole structure, as will be explained. If the fabric is weftless, the plastic is preferably applied by passing the sheeted fibers through a bath of the plastic to treat all sides of the individual fibers and then passing the treated sheet between rollers to remove excess plastic.

If fabric with a weft is used, it is preferably treated with a stiffening and cementing material prior to shaping. This may be done by spraying a solution of the stiffening material onto the fabric or by dipping the fabric into the solution or by application in any suitable manner. Various types of materials are available for stiffening. Compositions which set to resinous materials on heating are preferred, such as thermo-set resins and polymerizable components. Compositions which set on oxidation might be used. Many suitable materials are available on the market. The polymerized aryl silicones would probably be quite satisfactory.

It will usually be advantageous to use a preparation which in the unset or uncured state is sufficiently adhesive so that the sheets of glass fabric or the like after being treated with it may be united by pressure. Thus, a mold, such as the mold illustrated in Fig. 2, might be made of several plies, each composed of several pieces united by merely applying pressure to overlapping portions at the joints and as necessary to secure a good bond. If the mold is to be used for curing foamed latex or other liquid, the stiffening material is preferably one which renders the mold liquid-tight.

Although other stiffening agents may be employed, as indicated, a composition known as Allymer CR171 (manufactured by the Columbia Chemical Division of the Pittsburgh Plate Glass Company, of Pittsburgh, Pennsylvania, and said to be a heat-polymerizable material derived in part from allyl alcohol) has been employed satisfactorily. About 40 to 45 per cent of this resin to 55 to 60 per cent (by weight) of the glass fabric has been found to render the glass fabric adhesive before curing, has made the fabric stiff but not brittle after curing, and has formed with the glass fabric a liquid-tight receptacle.

Figure 3:
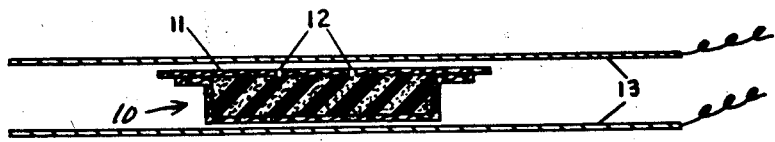
Fig. 3 shows the finished glass mold in use in a high-frequency field.

The bottom part of the finished mold, which is indicated by the reference numeral 10 in Fig. 3, is formed by heating the resin-treated fabric under the conditions required for curing the particular stiffening agent employed. A steam kiln, such as used for rubber vulcanization, has been found satisfactory for curing the mold. The mold is preferably cured while still on the building form. It is then inverted as shown in Fig. 3. The top of the mold 11, formed of several plies of glass fabric treated with the resin, is similarly cured. The glass fabric which forms the top 11 may be indented slightly throughout an area the size of the mold 10 so that the two parts of the glass mold may be brought into exact register. Openings 12 are provided in the cover through which steam generated on curing escapes, and excess of the material being cured is forced as the volume of the charge is increased on heating.

Instead of merely manually pressing the fabric to the building form shown in Fig. 2 in order to shape it, a more uniformly smooth structure is formed by enclosing the covered form in an ordinary vacuum bag or sucking an ordinary vacuum blanket down onto it. The form may be covered with Cellophane to prevent adhesion of the adhesive stiffening material to the inner surface of the bag or blanket. As is well known, such a bag is open at one end, and after the object to be treated has been inserted in it, the open end is rolled a time or two and then clamped to make an airtight seal. The air is then sucked out of the bag to cause the atmospheric pressure to press tightly against the surface of the glass fabric. If a vacuum blanket is used instead of a bag, the edges are clamped to the edge of a table or platform provided with suction means so that the blanket may be drawn onto any building form covered with glass fabric or the like which is placed on the table or platform. By either process the glass fabric is pressed evenly over the entire surface of the mold, and good adhesion is secured between overlapping plies and at the joints. The plastic is cured while being pressed to the form by the bag or blanket. The bag or blanket is then removed; Cellophane, if used, is peeled from the fabric; and the glass fabric stiffened by the cured resin is then easily separated from the mold and is ready for use, as shown in Fig. 3.

Figure 10:
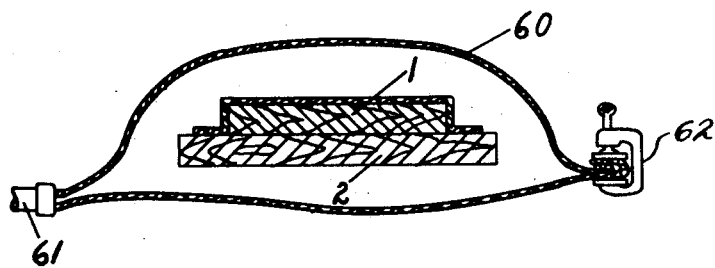
Fig. 10 is a section illustrating the fabric-covered building form and base in a vacuum bag before drawing a vacuum.
Figure 11:
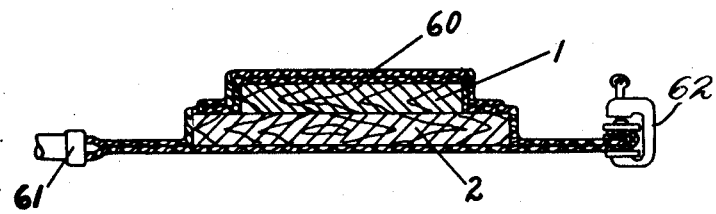
Fig. 11 shows the same after drawing a vacuum.

Fig. 10 shows a vacuum bag 60 connected to a vacuum line 61 surrounding the form 1 and base 2 covered with glass fabric and with the clamps 62 tightened across the open end of the bag. Fig. 11 shows the same after the vacuum has been drawn on it and shows the vacuum bag 60 pressing the entire surface of the glass fabric uniformly against the building form 1 and base 2.

Instead of using a vacuum bag, a pressure bag, such as a steam bag or air bag, may be employed. Such a bag will be inflated above the glass-fabric surface in a vented chamber. The bag on inflation removes the air from the chamber through the vent and presses against the inner walls of the chamber and against the fabric and thus presses the fabric uniformly and smoothly against the surface of the building form. If steam is used for inflation of the bag, the stiffening material may be heated in this manner so that the mold is cured during the inflation.

Figure 12:
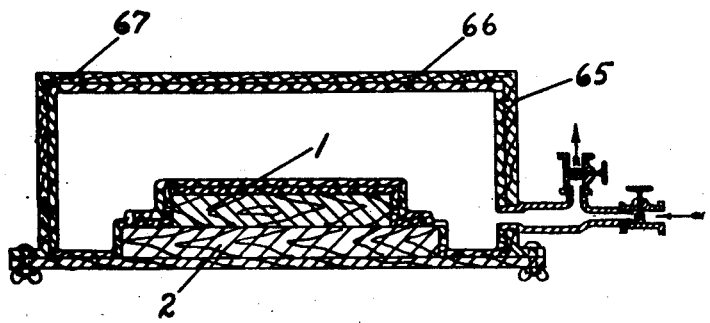
Fig. 12 illustrates the similar use of a pressure bag.

Fig. 12 illustrates the same fabric-covered building form 1 and base 2 in a chamber 65 with a pressure (either steam or air) bag 66 inflated against the interior walls of the chamber and pressing the fabric uniformly to the surface of the building form and base. Vents 67 are provided for the escape of air from the chamber. Valves for inflating and exhausting the bag are illustrated. Steam may be used advantageously so that the plastic on the fabric is cured simultaneously with inflation.

In Fig. 3 the means for generating the high-frequency field is shown simply by conventional plates 13. The equipment shown may be used for curing any plastic. The operation will be described in connection with foamed latex. The surface of the mold is generally first treated with any of the compositions which have been found to prevent adherence of latex foam, such as those used on metal molds. The mold 10 is then filled with the latex foam, and the cover 11 is placed on top of it. The mold and contents are then subjected to the high-frequency field to heat the latex, and the heating is continued for the time required to produce vulcanization. When the cure is completed, the mold is removed from the high-frequency field, and the cured sponge product is removed from the mold.

Figure 4:
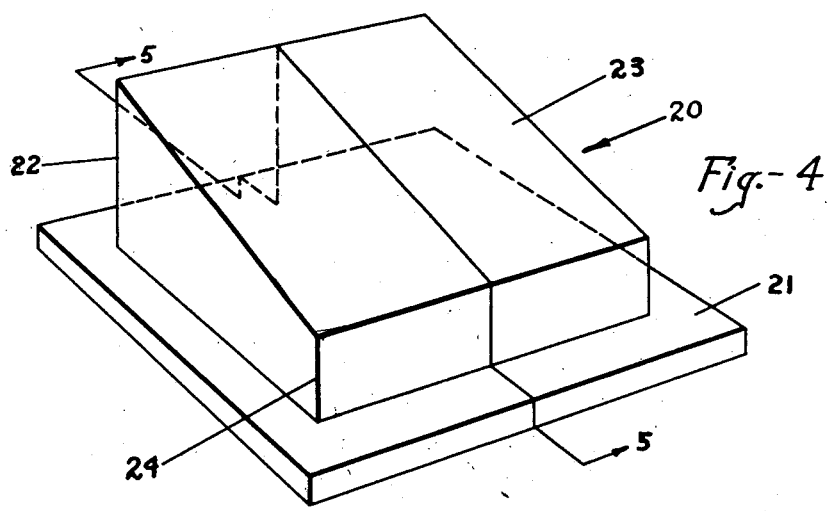
Fig. 4 shows another building form in perspective.

Fig. 4 shows in perspective a pattern 20 for a conventional seat back which is mounted on the base 21. The base of the seat is indicated by the reference numeral 22, and the surface 23 forms the surface of the seat against which a person will recline. This mold is tapered gradually from the edge 22 to the edge 24. It will be noted that the depth of the seat at the surface 22 is at least about twice that at the edge 24. The pattern and base may be of wood or plaster of Paris or other material suitable for the construction of a pattern or building form.

Figures 5, 7:
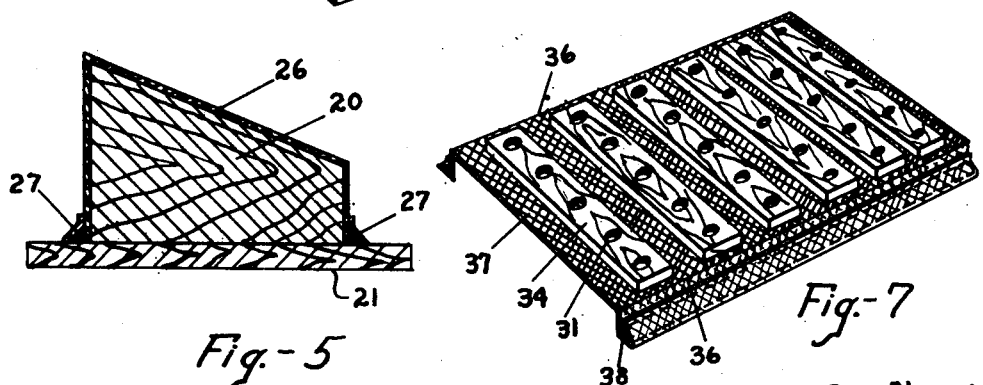
Fig. 5 is a section on the line 5—5 of Fig. 4 but with the building form shown as made of wood and with a glass-fabric mold formed over it.
Fig. 7 shows in perspective the cover of the finished mold.

Fig. 5 shows a section through the building form which is made from the pattern 20 and the base 21 (both assumed to be of wood) and shows treated glass fabric 26 shaped to conform to the shape of the pattern 20. The glass fabric is shaped in the manner previously described. At the sharp vertical edges the excess fabric may be cut away and one edge of the cut fabric lapped over the other.

The mold is reinforced around its perimeter. The drawings show wooden reinforcing members, but vulcanized fiber and other electrically nonconductive materials may be employed. The glass fabric is brought down over the surface of the pattern 20 and laid flat on the base 21. The wood strips 27 are then put in place, and the edges of the fabric are folded back over these strips. All four edges of the fabric may be reinforced in this manner with the ends of the strips mitered to fit one another at the corners, and joined by an adhesive. The uncured stiffening material in the fabric is adhesive and unites the turned-back edges of the fabric to the body of the fabric, as illustrated. (For purposes of illustration, it is necessary to exaggerate the thickness of the fabric, and it is shown as a single ply instead of indicating the four to six plies which would normally be used for this size mold.) If the mold is exceedingly large, one or more reinforcing strips may be used intermediate the ends of the mold. Such intermediate reinforcement may be accomplished by laying strips of wood over the glass fabric while it is still on the building form and laying narrow widths of glass fabric over these strips to unite them to the glass form. A vacuum bag or pressure bag is used to advantage to aid in shaping the fabric to the building form. After shaping, the form is stiffened by heating to cure the resin. The completed bottom portion of the mold is shown inverted in Fig. 6 and is identified by the reference numeral 29.

Figures 6, 8:
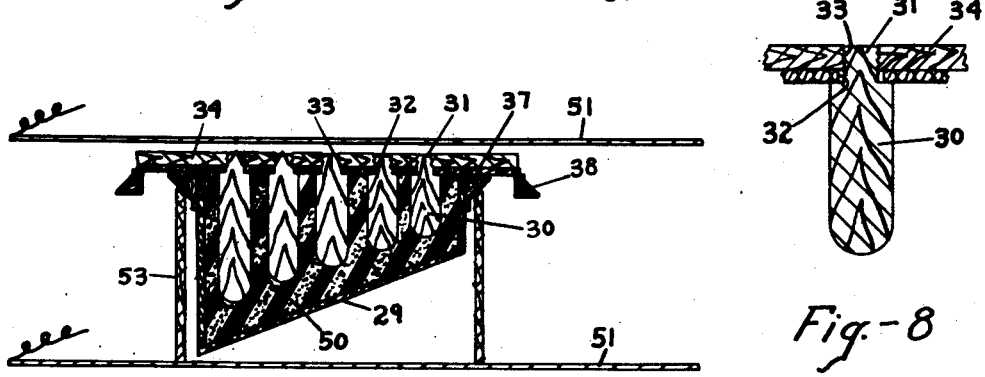
Fig. 6 is a section through the finished mold in use in a high-frequency field.
Fig. 8 is a detail showing one method of fastening cores in a reinforced cover.

Figs. 6–8 illustrate one advantageous manner of fastening cores to a glass mold. These cores are of the usual shape and are employed to add resiliency to a cushion or other sponge-rubber product. The cores may be of uniform height or may vary in height as is customary at the present time.

According to a preferred method of uniting the cores to the mold, illustrated in Figs. 6–8, the cores 30 are provided with threaded studs 31 which are inserted through holes 32 in the fabric and screwed into tapped holes 33 in the strips 34, which may be wood or vulcanized fiber or other suitable reinforcing material.

The studded ends of the cores may be dipped in a suitable adhesive before being screwed into place. The plastic used for stiffening the fabric will ordinarily be satisfactory for this purpose, and if used, the mold will be cured a second time to secure the cores in place.

As is known, forms for mattresses and the like require as many as a thousand or more such cores. These add materially to the weight of the mold. By fastening them into the strips 34, this weight is distributed over the whole mold surface. These strips 34 may extend to the edges 36 of the glass top 37 of the mold, and if desired, reinforcing strips of wood or the like 38 may run the length of the mold 37 to support the weight of the cores. The reinforcing strips 34 need not be united by adhesive or other means to the top 37 although this may be done. Furthermore, the strips 34 may be united to the side reinforcing strips 38 if there is an advantage in so doing. The plastic used for stiffening will ordinarily be found satisfactory for this purpose.

Figure 9:
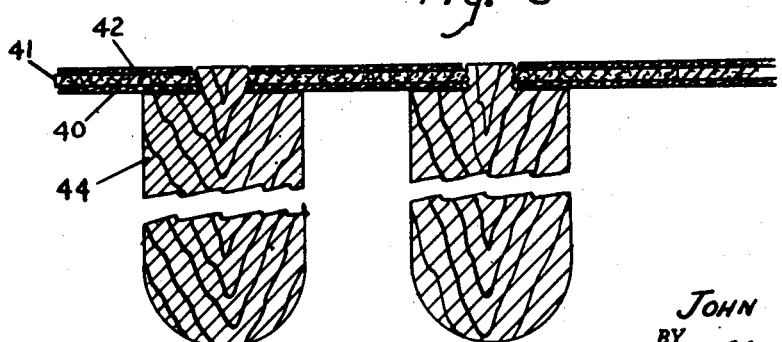
Fig. 9 is a detail showing an alternative method for such reinforcement.

Fig. 9 illustrates an alternative construction for reinforcing and fastening the cores. The top of the form is first covered with one or more plies of glass fabric 40, then a reinforcing strip of wood or vulcanized fiber 41 or the like, and then another one or more plies of glass fiber 42, if and as necessary. The reinforcing strip 41 covers the whole area of the mold cavity. Not all of the plies 40 and 42 need extend over the side wall and around a reinforcing strip (such as the strip 38 of Figs. 6 and 7). The holes 43 in the ply 41 of fiber or wood are tapped and hold the cores 44 when screwed into them. Plastic is advantageously used to prevent leakage around the threads in the hole 43.

The completed mold with the cores in place and filled with latex foam 50 is heated in a high-frequency field, illustrated in Fig. 6 by conventional plates 51. The mold may be supported on a rectangular wooden cradle 53 on which the wooden reinforcing strips 27 rest, or it may be supported in any desired manner. An important feature of the invention lies in the discovery that a foamed latex or the like can be cured in a shell-like mold of irregular cross section with an air pocket between the mold and the electrode nearest it.

In most high-frequency heating and curing operations the irregularly shaped air pocket between the bottom 29 of the mold and the lower plate 51 would cause the thick end (the left-hand end) of the plastic-filled mold to heat more rapidly and to a higher temperature than the balance of the plastic in the mold. The air is such an efficient insulator that the effect of the electrodes would be intensified where there is the least impedance. As a result, the plastic in this end of the mold would be cured while that in the other end would remain uncured or only partly cured.

However, foamed latex and other dielectric thermosetting materials which contain water which is volatilized during the cure do not act this way if the presence of the water makes the contents of the mold an electrolyte and its absence makes the contents a dielectric. The cured, dehydrated rubber sponge is a good dielectric. The left end of the mold shown in Fig. 6 heats up most rapidly and initially is heated hotter than the other end. As the cure progresses and water is volatilized from this end, it becomes a poorer electrolyte. As this occurs, it is heated less, and the balance of the mold contents is progressively heated to a higher temperature until the contents of the whole mold have been heated sufficiently to cure the rubber and evaporate the water.

The drawings illustrate but one application of this newly discovered principle. Whatever the cause of the one portion being heated first or to a higher temperature, when the water is evaporated from this portion so that it becomes a poorer conductor, the other portions of the mold contents become relatively better conductors. Thus, the entire mold contents are eventually heated so that the entire mold contents are dried and cured.

It is to be appreciated that molds of any shape may be employed. They may be made by any conventional means, or novel means of manufacturing them may be utilized. Piece building forms may be used in shaping the molds to facilitate removal of the parts of the building form from the completed mold. Ordinarily, fabric (before or after treating with plastic) will be laid over the building form, and in the finished mold this fabric will be adjacent the inner surface of the molding cavity. Where the mold is to be used for steam curing, it is not necessary to use non-conductive materials although the invention relates more particularly to molds designed for high-frequency heating and their use. A metal fabric may, for example, be used where other heating means is employed. Ordinarily, several plies of fabric will be laminated together to give a mold sufficiently rugged to stand up under ordinary shop handling. Although the mold may be composed entirely of fabric suitably treated with a stiffening agent, the fabric may where desired be backed by other strengthening material. Such strengthening material may be troweled or sprayed onto the back of the fabric or applied in any suitable manner and may be built up to any desired thickness. There are distinct advantages in using a minimum of such strengthening material to have a shell-type of mold because of its cheapness of construction, lightness in weight, and the fact that the thinner walled mold tends to waste less energy in heating, etc. Instead of making the mold entirely of fabric, one or two plies or any like small number of plies may be used backed by glass wool, mineral wool, absestos fiber, and the like treated with a suitable resin-forming material. Cements of inert nonconductive materials, such as magnesium oxide, etc., compounded with a solution of the resin-forming material may be utilized, for example, for filling in pores and openings, etc. A mold with a fabric face thus reinforced may be backed with another outside ply of fabric to lend compactness to the mold.

The material being molded is imprinted with an exact reproduction of the molding surface. A fabric facing on the molding surface is, therefore, desired because it gives an attractive appearance to the product. Where appearance is unimportant, or where for any other reason there may be an advantage in doing so, the molds may be of shell-like construction without having a fabric facing. A cement of magnesia and a resin-forming material may be troweled on the surface of the mold, or fibers or powder may be blown onto the mold surface and suitably adhered to one another.

Although the cores 30 are illustrated as formed of a single piece of wood, they may be made of glass or porcelain or other nonconductive material for high-frequency heating, and may even be made of light-weight metal for steam curing. The stud 31 may be a unitary part of the core, or it may be separately formed and united to the core in any suitable manner.

Variations may be made in the manner of construction, the nature of the construction materials employed, the shape and number of parts in the mold, in the manner of use, and in other ways without avoiding the invention which is defined in the appended claims.

What I claim is:

1. A mold part adapted for use in a high frequency field, the part being provided with a molding cavity adapted to produce a sponge rubber article from foamed latex, the molding surface of the cavity being formed of a stratum of glass fibers with stiffening composition adhering thereto.

2. A mold constructed for use in a high-frequency field, with a molding cavity therein, the wall of the cavity being composed essentially of glass fibers with stiffening composition adhering thereto to give the wall shape.

3. A mold constructed for use in a high-frequency field and adapted to produce a sponge rubber article from foamed latex, which mold is composed of at least two parts which form an enclosed molding cavity, with most of the surface of the molding cavity in each part being formed of fibers with stiffening composition adhering thereto, and at least one vent near the top of the molding cavity for the escape of steam generated during the curing.

4. A mold adapted to product a sponge rubber article from foamed latex, which mold is composed of a bottom part constructed for use in a high-frequency field and a cover, with at least one vent near the top of the mold for the escape of steam generated during the curing, the bottom part including the molding surface being composed of strata of fibers with stiffening composition adhering thereto.

5. A mold part with a wide-mouthed mold cavity adapted to produce a sponge rubber article from foamed latex, constructed for use in a high-frequency field and formed of stiffened and cemented superimposed layers of fibrous material and of substantially uniform thickness throughout with local reinforcing means.

6. A mold constructed for use in a high-frequency field and having a molding cavity, said mold being formed of laminae of fibers with stiffening composition adhering thereto to give the mold shape, the mold being reinforced at the mouth of the cavity with reinforcing material enclosed in an edge of one of the laminae.

7. Two registering mold parts which form a closed molding cavity adapted to produce a sponge rubber article from foamed latex, at least one vent near the top of the molding cavity for the escape of steam generated during the curing, at least a portion of the wall of the molding cavity in each part being molded and with the surface of the cavity being composed of a stratum of fibers with resinous material adhering thereto.

8. A mold constructed for use in a high-frequency field having a molding cavity therein adapted to produce sponge rubber from foamed latex, a cover for said cavity, the molding surface of said cavity being composed of fibers with stiffening composition adhering thereto, and cores in the cavity supported by said cover.

9. A mold constructed for use in a high-frequency field having a molding cavity therein adapted to produce sponge rubber from foamed latex, a cover for said cavity, the molding surface of said cavity and the inner surface of said cover being composed of fibers with stiffening composition adhering thereto, one or more reinforcing elements on the outside of said cover, cores within the cavity, and studs carried by said cores, which studs penetrate the cover and are secured to said reinforcing element or elements whereby said element or elements support said cores.

10. A mold constructed for use in a high-frequency field having a molding cavity therein adapted to produce sponge-rubber from foamed latex, a cover for said cavity, the molding surface of said cavity and the inner surface of said cover being composed of fibers with stiffening composition adhering thereto, reinforcing material on the outside of the cover with tapped holes therein, and cores in the cavity with threaded studs which are screwed into said holes.

11. A mold constructed for use in a high frequency field and composed of a bottom part, a cover and a supporting member, the portion of the bottom part which forms the bottom of the molding cavity being adapted to hold a liquid and being of molded construction with the surface of the molding cavity formed of a stratum of fibers with stiffening composition adhering thereto, the supporting member cooperating with the bottom part to hold the molding cavity with the intended liquid level horizontal, and the cover embodying cores which extend into the molding cavity when the mold is closed.

12. A mold constructed for use in a high frequency field and composed of a bottom part, a cover, and a supporting member, the portion of the bottom part which forms the bottom of the molding cavity being adapted to hold a liquid and being of molded glass fiber impregnated with stiffening composition, the supporting member cooperating with the bottom part to hold the intended liquid level horizontal, the cover embodying a top closure for the molding cavity.

13. The method of curing a non-volatile dielectric thermosetting composition by high-frequency heating in the presence of an electrolyte composed largely of liquid which is rapidly vaporized on heating to a temperature at which the thermosetting composition is cured, with the electrolyte mixed with the thermosetting composition, the cure being effected in a mold of dielectric material positioned between two electrodes in such a manner as to provide an air gap of varying thickness between one of the electrodes and the surface of the mold nearest to it, which method comprises creating a high-frequency field between the electrodes, whereby that portion of the mold contents which is in line with the thinnest portion of the air gap is heated first by said field, said portion of the mold contents is raised to a higher temperature than portions of the mold contents in line with thicker portions of the air gap, and liquid is vaporized from said portion of the mold contents, and maintaining said field until all portions of the mold contents have been progressively heated so as to vaporize liquid therefrom and cure the thermosetting material.

14. The method of curing foamed rubber latex by high-frequency heating in a mold of dielectric material positioned between two electrodes in such a manner as to provide an air gap of varying thickness between one of the electrodes and the surface of the mold nearest to it, the liquid of the latex being an electrolyte, which method comprises creating a high-frequency field between the electrodes, whereby that portion of the latex which is in line with the thinnest portion of the air gap is heated first by said field, said portion of the latex is raised to a higher temperature than portions of the latex in line with thicker portions of the air gap, and liquid is vaporized from said portion of the latex, and maintaining said field until all portions of the latex have been progressively heated so as to vaporize liquid therefrom and cure the rubber of the latex.

15. A mold with an enclosed molding cavity therein adapted for the curing of foamed latex, at least one vent near the top of the mold for the escape of steam during the curing, the mold being formed of a cover and a bottom part, the wall of that portion of the cavity which is in the bottom part being composed of a plurality of plies of fibers impregnated with a resinous stiffening composition.

16. A mold for the molding of foamed latex and the like, the mold being formed of a bottom part and a cover, the bottom part having therein a molding cavity the wall of which is composed of strata of resin-impregnated fibers, the wall being reinforced around the mouth of the cavity by one or more reinforcing elements enclosed in extensions of said strata.

17. A mold for the molding of foamed latex and the like, the mold being formed of a bottom part and a cover, the bottom part defining a molding cavity and being formed essentially of strata of resin-impregnated glass fibers with reinforcing elements combined therewith.

18. The method of curing by high-frequency heating in a mold of dielectric material positioned between two electrodes, a non-volatile dielectric thermosetting composition dispersed in electrolyte composed largely of liquid which is rapidly vaporized on heating to a temperature at which the thermosetting composition is cured, the dispersion constituting a body of varying thickness with the distance between one portion of one surface of the dispersion and the electrode nearest it different from the distance between another portion of that surface and the electrode whereby uneven heating results, which method comprises creating a high-frequency field between the electrodes, whereby the thickest portion of the dispersion is heated first by said field, said portion of the dispersion is raised to a higher temperature than thinner portions of the dispersion and liquid is vaporized from said thickest portion of the dispersion, and maintaining said field until all portions of the dispersion have been progressively heated so as to vaporize liquid therefrom and cure the thermosetting material.

19. The method of curing by high-frequency heating in a mold of dielectric material positioned between two parallel electrodes, a body of a foamed rubber latex of varying thickness with the distance between one portion of one surface of the latex and the electrode nearest it different from the distance between another portion of that surface and the electrode whereby uneven heating results, the liquid of the latex being an electrolyte, which method comprises creating a high-frequency field between the electrodes, whereby the thickest portion of the latex is heated first by said field, said portion of the latex is raised to a higher temperature than thinner portions of the latex, and liquid is vaporized from said thickest portion of the latex, and maintaining said field until all portions of the latex have been progressively heated so as to vaporize liquid therefrom and cure the rubber of the latex.

JOHN A. SPERRY.

REFERENCES CITED

The following references are of record in the file of this patent:

UNITED STATES PATENTS

| Number | Name | Date |
|---|---|---|
| 1,454,243 | McIndoe | May 8, 1923 |
| 1,473,842 | Frederick | Nov. 13, 1923 |
| 1,475,623 | Egerton | Nov. 27, 1923 |
| 1,797,580 | Hopkinson et al. | Mar. 24, 1931 |
| 1,920,139 | Crosby | July 25, 1933 |
| 2,147,218 | Reimel | Feb. 14, 1939 |
| 2,204,617 | Peel et al. | June 18, 1940 |
| 2,206,757 | Taladay | July 2, 1940 |
| 2,219,054 | Palm et al. | Oct. 22, 1940 |
| 2,261,847 | Dufour et al. | Nov. 4, 1941 |
| 2,276,035 | Guhl | Mar. 10, 1942 |
| 2,280,771 | Dufour et al. | Apr. 28, 1942 |
| 2,290,612 | Riesing et al. | July 21, 1942 |
| 2,310,830 | Blair et al. | Feb. 9, 1943 |
| 2,324,644 | Powell et al. | July 20, 1943 |
| 2,325,637 | Stewart | Aug. 3, 1943 |
| 2,337,036 | Erdle | Dec. 21, 1943 |
| 2,370,624 | Gillespie | Mar. 6, 1945 |
| 2,340,278 | Sudman | Jan. 25, 1944 |
| 2,341,617 | Hull | Feb. 15, 1944 |
| 2,351,529 | Luxenberger et al. | June 13, 1944 |
| 2,369,892 | Greneker | Feb. 20, 1945 |

FOREIGN PATENTS

| Number | Country | Date |
|---|---|---|
| 392,952 | Great Britain | May 22, 1932 |
| 517,798 | France | Feb. 8, 1940 |